INVENTOR.
JACK P. COURTER
BY Paul L. Gardner
ATTORNEY

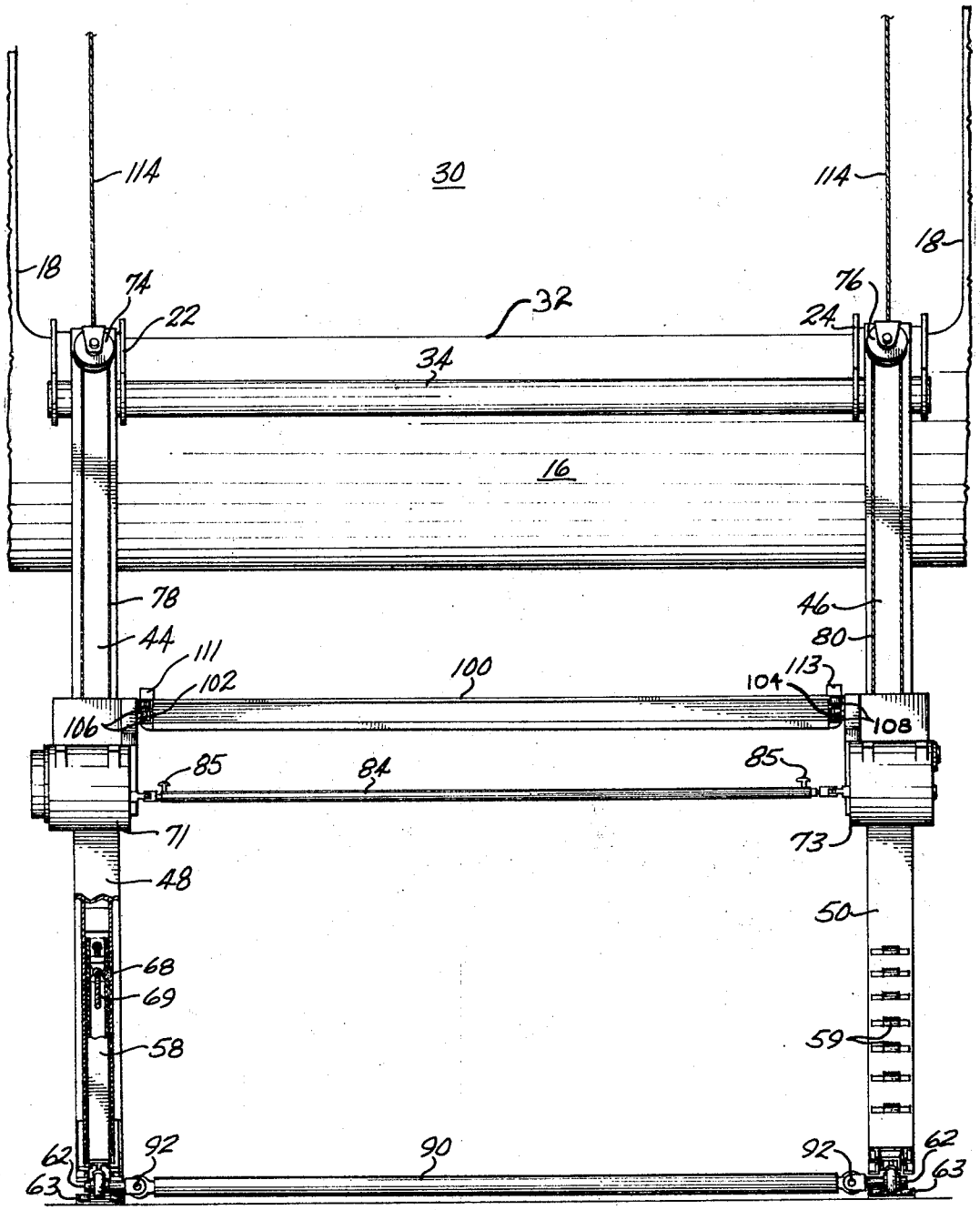

Nov. 18, 1969  J. P. COURTER  3,478,904
CARGO LOADING MECHANISM
Filed May 17, 1967  5 Sheets-Sheet 3
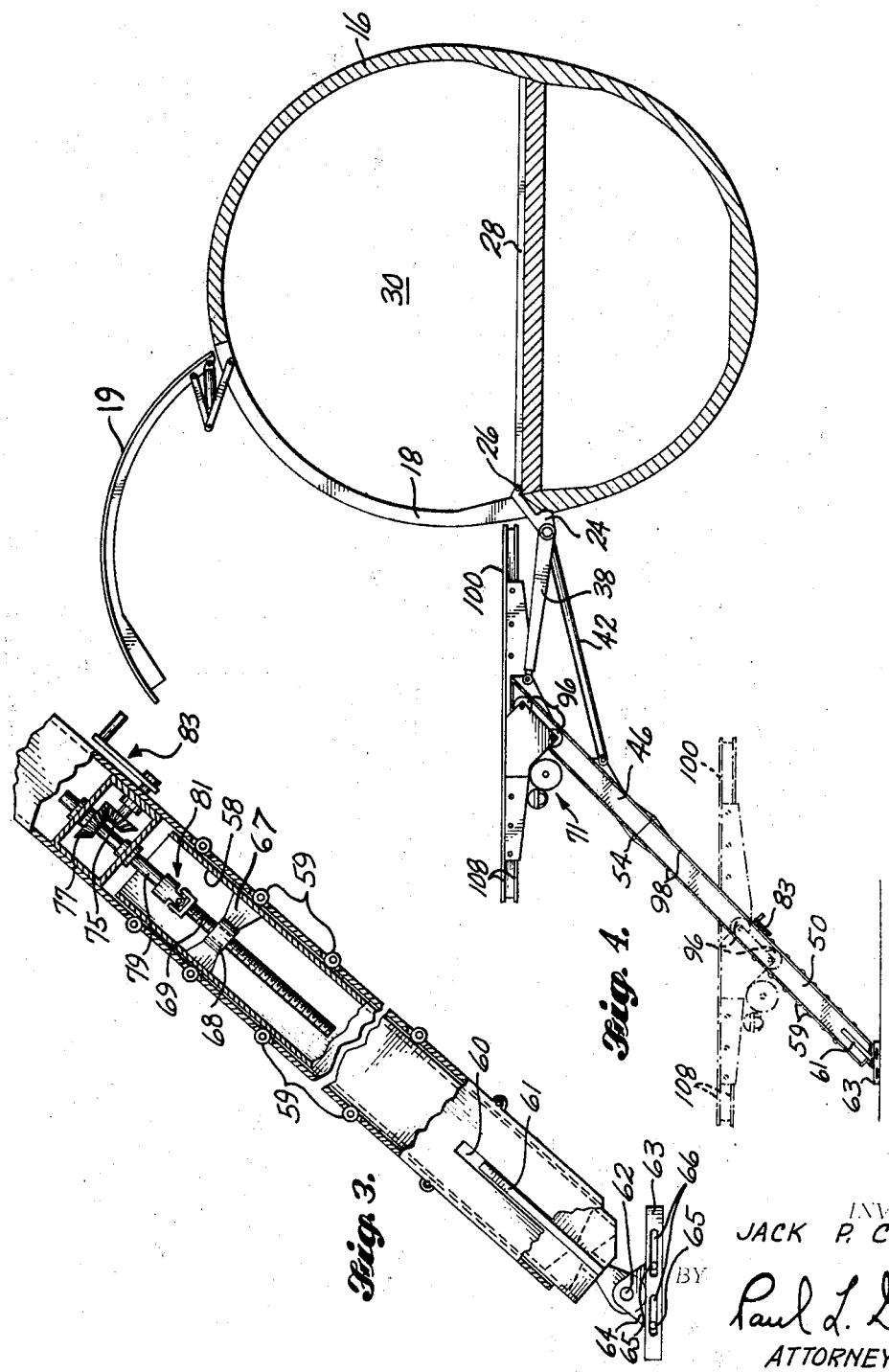
INVENTOR
JACK P. COURTER
BY Paul L. Gardner
ATTORNEY Nov. 18, 1969   J. P. COURTER   3,478,904
CARGO LOADING MECHANISM
Filed May 17, 1967                                                           5 Sheets-Sheet 4

INVENTOR
JACK P. COURTER

BY Paul L. Gardner
ATTORNEY

Nov. 18, 1969

J. P. COURTER 3,478,904

CARGO LOADING MECHANISM

Filed May 17, 1967

INVENTOR.
JACK P. COURTER

BY
Paul L. Gardner
ATTORNEY

' # United States Patent Office 3,478,904
Patented Nov. 18, 1969

3,478,904
CARGO LOADING MECHANISM
Jack P. Courter, Seattle, Wash., assignor to The Boeing Company, Seattle, Wash., a corporation of Delaware
Filed May 17, 1967, Ser. No. 639,242
Int. Cl. B60p *1/46;* B66p *9/20*
U.S. Cl. 214—75                              5 Claims

ABSTRACT OF THE DISCLOSURE

An airplane cargo loading mechanism for facilitating pickup and delivery of air freight at airports and remote locations that lack airplane ground support equipment, and adapted to be stored in the cargo compartment of the plane during flight without occupying valuable storage space. The loading mechanism includes a pair of parallel rails which, in the operating position of the mechanism, extend from the plane's cargo compartment to the ground, and a pair of motor-driven carriage assemblies which ride up and down the rails between the ground and the cargo compartment. A loader platform adapted to carry cargo pallets is mounted on the carriage assemblies by roller means which permit the platform to slide off the carriages and into the cargo compartment of the plane when the platform reaches the upper ends of the rails. The rails are pivotably connected to the plane and are comprised of upper and lower hinged sections adapted to fold up into the cargo compartment and lie on either side of the loader platform when the plane is in flight. One or more motor and winch assemblies are provided for driving the carriages and the loader platform up and down the rails and for extending and retracting the rails for use or storage.

BACKGROUND OF THE INVENTION

The present invention relates generally to cargo handling equipment, and more particularly to an improved cargo loading mechanism adapted to be stowed in the cargo compartment of an airplane when the plane is in flight without occupying valuable storage space.

The development of faster and larger jet airplanes has made it more convenient and economical to ship cargo by air to remote stations which lack cargo loading equipment, as well as to airports which maintain such equipment. When cargo is flown to such remote stations, it is necessary, of course, that cargo loading equipment be carried in the plane. However, most of the prior art airplane-carried cargo loading mechanisms take up valuable storage space in the planes and/or require structural modification to the planes to facilitate their storage during flight. Other cargo loading mechanisms which have heretofore been provided are not adapted to load certain sized or shaped cargo packages and/or are not adapted for installation or use in an airplane having a side loading cargo compartment (i.e., a compartment having its access doorway in the side of the fuselage).

SUMMARY OF THE INVENTION

In view of the foregoing, it is an object of the present invention to provide an improved airplane-carried cargo loading mechanism which does not occupy valuable storage space in the plane during flight.

Another object of this invention is to provide an improved airplane-carried cargo loading mechanism which is more efficient in operation than the prior art mechanisms and which is adapted for use in an airplane which has its cargo compartment access doorway located in the side of the fuselage.

Briefly, the cargo loading mechanism of the present invention comprises a rail assembly which extends between the cargo compartment of an airplane and the ground during loading and unloading operations, and a motor-driven loader platform adapted to ride up and down the rail assembly to carry freight to or from the cargo compartment. The loader platform is designed to slide off the rail assembly and onto the floor of the cargo compartment, with or without freight thereon, and the rail assembly is designed to fold up into the compartment and occupy a minimum amount of space on either side of the platform during flight.

The foregoing and other objects, features, and advantages of the present invention will be apparent from the following detailed description of a preferred embodiment of the invention, as illustrated in the accompanying drawings.

BRIEF DESCRIPTION OF THE DRAWINGS

In the drawings:

FIGURE 2 is a front elevation view of the cargo loading mechanism shown in FIGURE 1;

FIGURE 3 is a side elevation view of the extendible lower leg portion of one of the rail members of the loading mechanism, with part of the outer portion of the rail member broken away to show the details of the mechanism for extending the leg;

FIGURE 4 is a side elevation view of the cargo loading mechanism in its operating position and showing the airplane fuselage to which the mechanism is attached in cross-section.

DESCRIPTION OF THE PREFERRED EMBODIMENT

Figure 1:
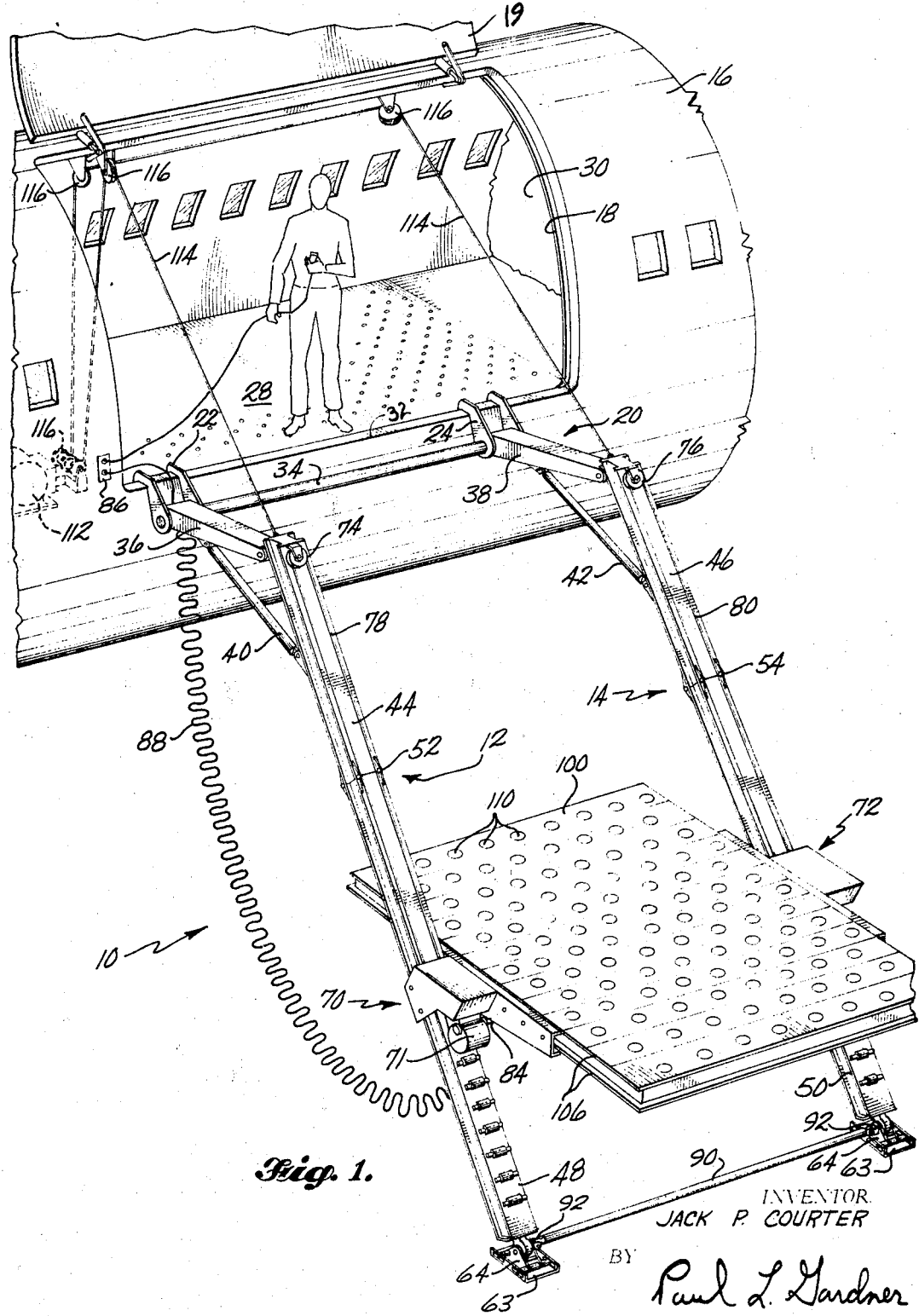
FIGURE 1 is a perspective view of a cargo loading mechanism constructed in accordance with the teachings of the present invention and shown in its operating position attached to the cargo compartment access doorway of an airplane.
Figure 5:
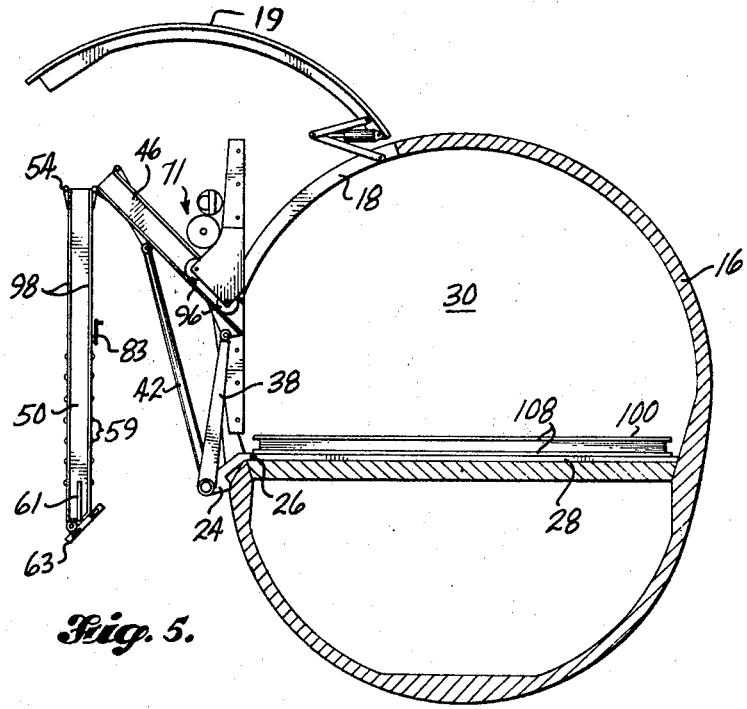
FIGURES 5–8 are side elevation views similar to FIGURE 4 illustrating the cargo loading mechanism in various positions through which it passes when being retracted into the plane for storage.
Figure 6:
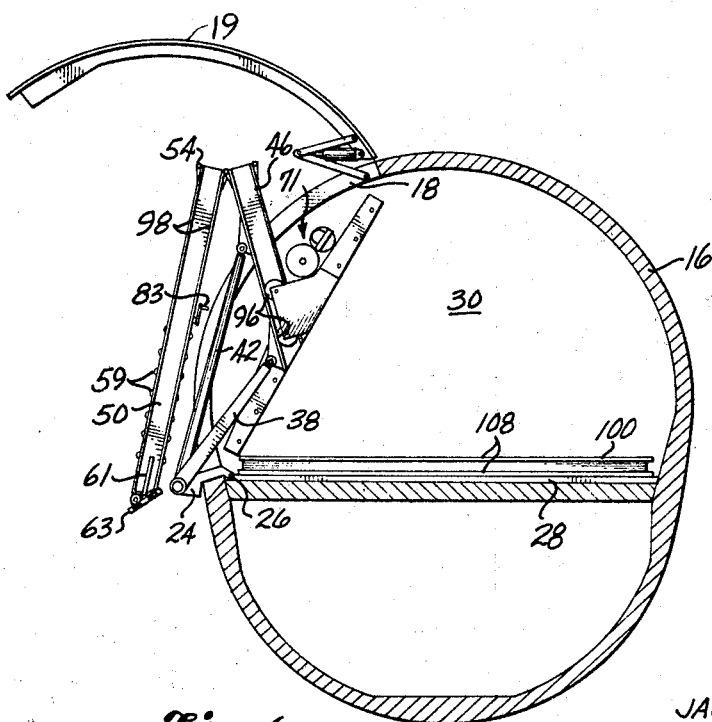
Figure 7:
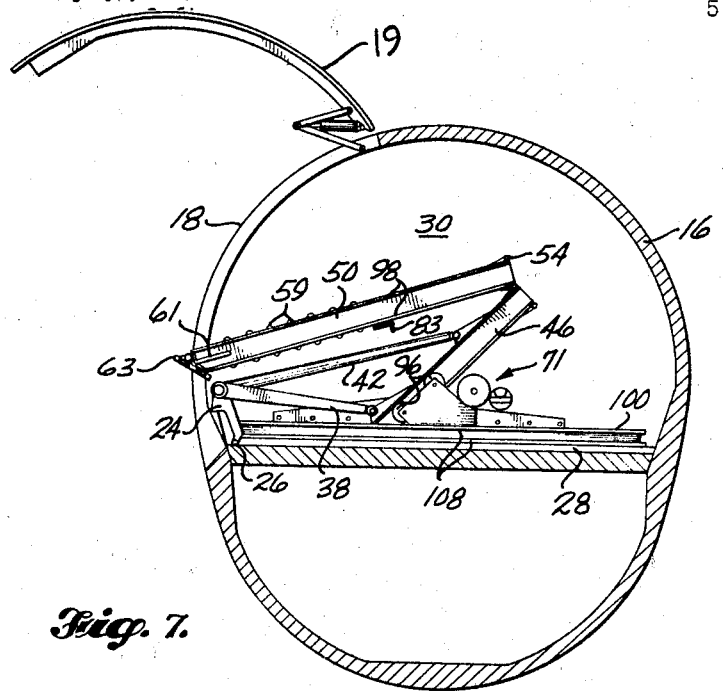
Figure 8:
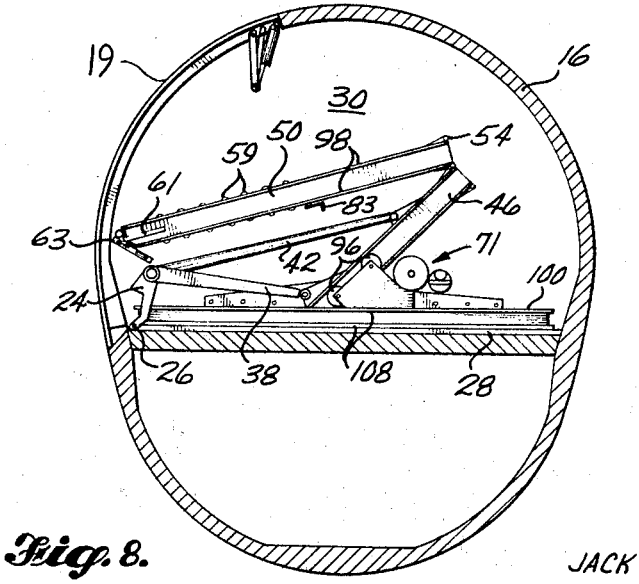

Referring now to the drawings, there is shown a cargo loading mechanism 10 which includes a rail assembly comprising a pair of parallel rail members 12 and 14 mounted in the cargo compartment access doorway 18 of an airplane fuselage 16 by means of an upper support frame 20. The support frame 20 comprises a pair of offset or "gooseneck" fittings 22 and 24 pivotably connected at 26 (see FIGURES 4–8) to the floor 28 of the cargo compartment 30 adjacent the lower edge 32 of the doorway 18, a pivot support member 34 connected between the fittings 22 and 24, and a pair of support arms 36 and 38 pivotably connected between the fittings and the rail members. Because of the offset or "gooseneck" design of the fittings 22 and 24, neither the support arms 36 and 38 nor any other part of the rail assembly will extend above the upper ends of the rail members 12 and 14 when the mechanism is in its operating position (the FIGURE 1 position). A pair of tension struts 40 and 42 are pivotably connected between the rail members 12 and 14 and the ends of the torque tube 34.

The rail members 12 and 14 are comprised of upper sections 44 and 46, and lower sections 48 and 50 which are hinged to one another at 52 and 54. The rail member sections are preferably constructed of a lightweight material, such as aluminum, in the form of box beams.

As best shown in FIGURE 3, each of the lower rail sections 48 and 50 has an extensible inner leg 58 telescopically mounted therein and extending out of its lower end. Roller members 59 are mounted in the outer surfaces of each of the lower rail sections 48 and 50 to facilitate extension and retraction of the inner leg 58, and one or more slots 60 are provided in the outer side surfaces of the rail sections to receive outwardly extending flanges 61 on the inner leg and guide the movement of the inner leg. The lower portion of the inner leg 58 is pivotably connected at 62 to a foot assembly 63 which includes ear portions 64 pivotably connected to the lower end of the inner leg and having pin portions 65, 65 extending outwardly therefrom, and a foot plate having slots 66, 66 therein for receiving the pins 65, 65. The pin and slot structure 65–66 facilitates positioning of the foot assembly on the ground when the rail assembly is lowered to its operating position.

The inner leg 58 may be extended relative to the outer leg 48 or 50 to maintain the loader platform level as it rides up and down the rails when the plane is parked on uneven ground. To this end, a structural member 67 is attached at its outer ends to the inner leg 58 and has a threaded central portion 68 which is adapted to ride up and down a threaded rod 69 mounted inside the leg structure. The threaded rod 69 is connected to a pair of bevel gears 75, 77 through a universal joint 81 and a connecting rod 79. A manually operable handle assembly 83 extends outside of the outer leg 48 or 50 and may be rotated to rotate the bevel gear 75. The inner leg 58 is extended or retracted relative to the outer leg 48 or 50 by simply turning the handle assembly 83.

A pair of carriage assemblies 70 and 72 are mounted on the rails 12 and 14 and are adapted to ride up and down the rails when the mechanism 10 is in its operating position. A pair of reversible motor and winch assemblies 71 and 73 are mounted on the carriages 70 and 72, respectively, and are connected to one another by a drive shaft 84. A pair of cables 78 and 80 are connected to pulleys 74 and 76 mounted on the upper ends of the rails 12 and 14 so that the motor and winch assemblies 71 and 73, when actuated, will wind or unwind the cables 78 and 80 and drive the carriages 70 and 72 up or down the rails 12 and 14 in unison. The motor in assembly 71 is connected to an electrical power receptacle 86 on the airplane fuselage 16 by means of a conventional extensible electrical cable 88.

As best shown in FIGURE 4, the carriage 70 and 72 ride up and down the rails 12 and 14 by means of rollers wheels 96, 96 which are rotatably mounted on the carriages and received in track means defined by runners 98, 98 on the outer sides of the rails 12 and 14.

A cargo platform 100 is mounted between the carriages 70 and 72 for sliding movement relative thereto by means of cooperating rows of cam rollers 102 and 104 (see FIGURE 2) on the inner sides of the carriages and track means defined by runners 106 and 108 on the side edges of the platform. The cargo platform 100 includes suitable ball transfer units 110 mounted in the upper surface thereof to facilitate movement of cargo pallets across it, and cargo pallet edge guides 111, 113 (see FIGURE 2). Suitable anti-friction roller means (not shown) may also be provided on the lower surface of the platform to facilitate movement of the platform across the floor of the airplane cargo compartment.

In the disclosed embodiment, the entire loader mechanism 10 is extended and retracted from the airplane cargo compartment by means of a separate reversible electric motor 112 mounted in the airplane and adapted to wind or unwind a cable 114 which passes through a network of pulleys 116 and has its ends connected to the upper ends of the rails 12 and 14. Alternatively, however, the motor 112 may be eliminated and the motor and winch assemblies 71 and 73 may be replaced by suitable reversible motor-clutch-winch assemblies would be clutched to wind or unwind the cables connected between them and the cargo compartment ceiling. To drive the loader platform up or down the rails 12 and 14, the motor-clutch-winch assemblies would be clutched to wind or unwind along the cables 78 and 80 and would operate in the same manner that they do in the disclosed embodiment.

In operation, assuming that the loading mechanism 10 is initially in its stowed position in the airplane cargo compartment 30 (FIGURE 8), the cargo compartment door 19 is opened and the reversible motor 112 is actuated in a direction to retract the cable 114 and lift the upper ends of the rails 12 and 14. When the upper ends of the rails reach their upper limit of movement (FIGURE 5 position), the direction of the motor 112 is reversed to permit the cable 114 to extend and allow the mechanism to lower to the ground. An attendant in the cargo compartment may give the mechanism a slight push out of the cargo compartment at the time the direction of the motor 112 is reversed since the mechanism at that time will be in a neutral equilibrium position and might fall back into the compartment 30 when the cable 114 is extended. As the motor 112 unwinds the cable 114, the weight of the mechanism lowers it to the ground, and each of the lower rail sections 48 and 50 will form a single extended rail structure with its associated upper rail section 44 or 46. If the plane is parked on uneven ground, the handle 83 (see FIGURE 3) on one or both of the lower rail sections 48 and 50 may be turned to extend the inner leg 58 until the foot plate 63 rests on the ground.

The cargo platform 100, which rests on the cargo compartment floor 28 during flight (see FIGURES 5–8), may then be slid out of the doorway 18, and its side edge runners 106 and 108 will engage the rollers on the carriages 70 and 72 which are located at the upper ends of the rails 12 and 14. Movement of the loader platform away from the airplane fuselage 16 may be limited by one or more conventional pins (not shown) located on either or both sides near the back portion of the cargo platform 100 which will strike the rearmost cam rollers 102 and 104 on the carriages to prevent the platform from sliding forwardly off the carriages. Similar pins (not shown) may be provided on the sides of the platform for insertion between adjacent rollers 102, 102 and 104, 104 in the carriages 70 and 72 to lock the platform on the carriages and prevent forward or reverse movement of the platform relative to the carriages.

With the cargo platform 100 locked between the carriages 70 and 72, the motor and winch assemblies 71 and 73 may be operated to cause the carriages and the platform to ride down the rails 12 and 14. When the cargo platform 100 reaches its lowermost position, the motor and winch assemblies 71 and 73 are turned off and freight may be loaded on the platform. The loader and winch assemblies 71 and 73 are then actuated to drive the loader platform back up the rails 12 and 14 until it reaches a position substantially aligned with the cargo compartment floor 28. The freight may then be pushed off the cargo platform 100 and into the cargo compartment, the ball transfer units 110 on the platform and similar units (not shown) mounted on the cargo compartment floor 28 facilitating such movement.

The cargo platform 100 may then be lowered and raised in the same manner described above until all of the freight to be loaded has been placed on the plane. When the last load of freight is carried up the rails 12 and 14, it need not be pushed off the platform and into the plane. Instead, the entire cargo platform 100 may be unlocked from the carriage assemblies 70 and 72 and pushed onto the cargo compartment floor 28 with the freight thereon. The motor 112 may then be actuated to retract the cable 114 and pull the upper support structure 20 and the rails 12 and 14 back into the cargo compartment.

The sequence which the upper support frame 20 and the rails 12 and 14 pass through when being retracted into the cargo compartment is illustrated in FIGURES 4–8. As the rails 12 and 14 are lifted by the cable 114, the lower rail sections 48 and 50 will fold at the hinge points 52 and 54 relative to the upper rail sections 44 and 46. The cable 114 will continue to pull the rails 12 and 14 upwardly until they reach their upper limit of movement (the FIGURE 5 position). At this point, the direction of the motor 112 is reversed to extend the cables 114 and, aided by the push of an attendant, the folded rails will lower to the cargo compartment floor 28 of the cargo compartment and lie along either side of the cargo platform 100. The loading mechanism 10 does not occupy valuable storage space in the plane, since the cargo platform 100 lies flat on the cargo compartment floor 28 and may carry freight during flight. The only usable space occupied by the mechanism during flight will be the small area taken up by the folded rails on either side of the loader platform.

As noted above, the fittings 22 and 24 which connect the motor mechanism 10 to the airplane fuselage 16 are of an offset of "gooseneck" design so that no portion of the rail assembly will extend above the upper ends of the rails 12 and 14 when the loading mechanism 10 is in its operating position. Thus, when the cargo loader platform 100 carries an elongated or oddly shaped piece of freight up to the level of the cargo compartment floor 28, there are no obstructions on the sides of the cargo platform 100 to prevent such freight from being turned or otherwise maneuvered to get it into the cargo compartment.

As can be seen from the foregoing, the cargo loading mechanism 10 of the present invention may be carried in an airplane cargo compartment without occupying valuable cargo storage space, and may be utilized at remote loading stations to pick up and/or deliver cargo.

While the invention has been described and illustrated herein with reference to a preferred embodiment thereof, it will be understood by those skilled in the art that various changes in form and details may be made therein without departing from the spirit and scope of the invention.

What is claimed is:

1. In combination with a longitudinally extending airplane fuselage having a cargo compartment therein and a peripheral edge wall defining a cargo compartment doorway in one side of the fuselage, a cargo transfer mechanism comprising:

an upper support frame pivotably connected to the airplane fuselage for movement into and out of the cargo compartment;

the upper support frame comprising a pair of longitudinally spaced fittings pivotably connected to the airplane fuselage adjacent the peripheral edge wall of the doorway, a longitudinally extending pivot support member connected between the fittings and a support arm pivotably connected to each of the fittings;

a pair of spaced rail members having upper end portions pivotably connected to the support arms of the upper support frame and lower end portions adapted to sit on the ground; each of the rail members comprising a pair of box beam rails hinged to one another and having means defining roller receiving tracks therein;

telescoping foot assemblies secured in the rail members and extending out of the lower end portions thereof;

adjustable jack screw means connected to the foot assemblies for selectively extending and retracting such foot assemblies relative to the lower end portions of the rail member;

power operable carriage assemblies mounted on the rail members; the carriage assemblies including power driven wheels received in the tracks in the rail members;

motor and winch means operatively connected to the rail members and to the carriage assemblies for selectively extending and retracting the upper support position outside of the airplane wherein the hinged frame and the rail members between an operating box beam rails form a pair of spaced upstanding rails and a stowed position wherein the hinged box beam rails and the support frame are folded and wholly contained within the cargo compartment, and for selectively driving the carriage assemblies up and down the rail members when the rail members are in the operating position;

a cargo platform having spaced side edges disposed between the carriage assemblies; and cooperating roller and track means disposed on the carriage assemblies and the side edges of the cargo platform for permitting the platform to be slid off the carriage assemblies and into the airplane cargo compartment when the carriage assemblies and the cargo platform are raised to the upper end portions of the rail members.

2. The combination according to claim 1, wherein the support arms of the upper support frame are connected to the fittings at points below the upper end portions of the rail members when the cargo transfer mechanism is in its operating position.

3. The combination according to claim 2, wherein said cargo platform further comprises ball transfer units mounted in the upper surface thereof for facilitating the movement of cargo thereon.

4. In combination with a longitudinally extending airplane fuselage having a cargo compartment therein and a peripheral edge wall defining a cargo compartment doorway in one side of the fuselage, a cargo transfer mechanism for disposition in an operating position to transfer cargo between the cargo compartment and the ground and in a stowed position for storage within the cargo compartment, comprising:

a pair of spaced apart rail means pivotally mounted to the airplane fuselage at points adjacent the peripheral edge wall of the cargo compartment doorway and extending transversely and downwardly of the airplane fuselage to the ground when the cargo transfer mechanism is in the operating position and pivotally disposed wholly within the cargo compartment when the cargo transfer mechanism is in the stowed position;

carriage means mounted on said rail means for movement along the length thereof between an upper position and a lower position when the cargo transfer mechanism is in the operating position;

a cargo platform slidably mounted on said carriage means and between said rail means for carriage by said carriage means between the upper and the lower positions when the cargo transfer mechanism is in the operating position;

cooperating means disposed between said carriage means and said cargo platform for permitting said cargo platform to be transversely slid between said carriage means and the inside of the cargo compartment when said carriage means is in the upper position; and drive means operatively connected to said rail means and to the airplane fuselage for pivoting said rail means upwardly from the operating position and into the cargo compartment to the stowed position at the sides of the cargo platform when said cargo platform is in the cargo compartment.

5. The combination as claimed in claim 4 wherein each of said rail members further includes:

a support arm having an inboard end and an outboard end, said inboard end pivotally attached to the airplane fuselage for rotational movement about a longitudinal axis substantially parallel to the longitudinal axis of the airplane fuselage; and a rail member having an upper section and a lower section, one end of said upper section attached to the outboard end of said support arm and said lower section pivotally attached to the other end of the upper section for rotational movement about a longitudinal axis substantially parallel to the longitudinal axis of the airplane fuselage;

whereby, when said cargo transfer mechanism is in the operating position, said support arms extend transversely and horizontally and said rail members extend transversely and downwardly of the airplane fuselage and, when said cargo transfer mechanism is in the stowed position, said support arms and said rail member sections fold upon themselves wholly within the cargo compartment.

References Cited

UNITED STATES PATENTS

| | | | |
|---|---|---|---|
| 329,695 | 11/1885 | Banta | 214—75 |
| 339,737 | 4/1886 | Colburn | 187—12 |
| 1,298,499 | 3/1919 | Hansen | 187—12 |
| 2,701,068 | 2/1955 | Douglass et al. | 214—75 |
| 2,581,887 | 1/1952 | Saxton et al. | 187—12 |
| 2,966,996 | 1/1961 | Friend | 214—95 X |
| 3,002,719 | 10/1961 | Weiland | 214—75 X |
| 3,026,071 | 3/1962 | Barcellona et al. | 214—75 X |
| 3,061,113 | 10/1962 | Johnson | 212—145 |
| 3,263,831 | 8/1966 | Francis. | |

GERALD M. FORLENZA, Primary Examiner

RAYMOND B. JOHNSON, Assistant Examiner

U.S. Cl. X.R.

187—10; 244—137